J. E. BASTER.
TRACTOR.
APPLICATION FILED FEB. 26, 1919.

1,331,087.

Patented Feb. 17, 1920.
3 SHEETS—SHEET 1.

Inventor
Joseph E. Baster

By
Fred E. Billman, Attorney

J. E. BASTER.
TRACTOR.
APPLICATION FILED FEB. 26, 1919.

1,331,087.

Patented Feb. 17, 1920.
3 SHEETS—SHEET 2.

Inventor
Joseph E. Baster

By
Ohd C. Billman
Attorney

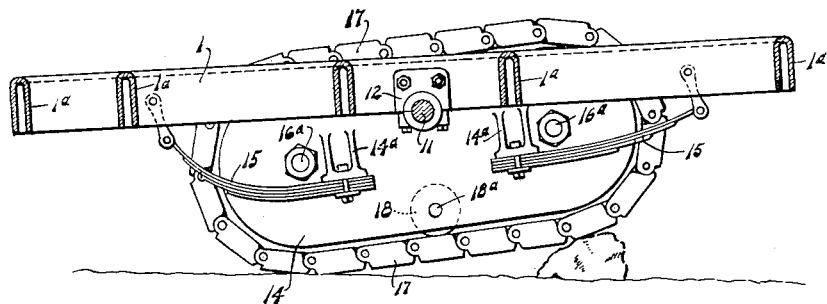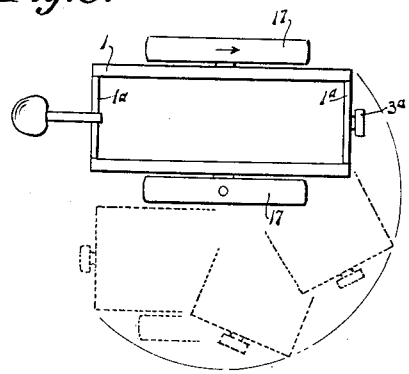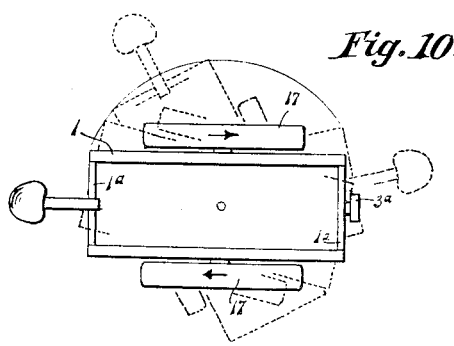

UNITED STATES PATENT OFFICE.

JOSEPH E. BASTER, OF CLEVELAND, OHIO.

TRACTOR.

1,331,087.　　　　　Specification of Letters Patent.　　Patented Feb. 17, 1920.

Application filed February 26, 1919. Serial No. 279,318.

*To all whom it may concern:*

Be it known that I, JOSEPH E. BASTER, a citizen of the United States, residing at Cleveland, in the county of Cuyahoga and State of Ohio, have invented certain new and useful Improvements in Tractors, of which the following is a specification.

My invention relates to improvements in tractors, and more particularly to that class or type known as "caterpillar" tractors in which the tractor units or side members are provided with driving and supporting wheels arranged within and adapted to drive endless traction members or "self-laying" track belts.

The primary object of the invention is to provide a generally improved tractor of this class or type which will be exceedingly simple in construction, cheap of manufacture, and efficient in use.

A further object is the provision of improved caterpillar tractor members or units together with improved means for driving, mounting and supporting the same.

A still further object is the provision of improved means for independently driving and controlling the caterpillar members or units together with improved gear and gear shift mechanism between such tractor units and the prime mover or motor whereby such tractor units may not only be driven simultaneously in forward and rearward direction, but may also be driven either singly in either direction or simultaneously in opposite directions, as in guiding or in making short turns, the latter driving movements of the tractor units enabling the tractor to be completely turned in a circle from a common center approximately midway between the two oppositely driven tractor units.

A still further object is the provision of improved means for flexibly and resiliently mounting the caterpillar tractor units to the tractor frame or chassis in independent relation to each other, thereby enabling the respective tractor units to pass over and absorb obstructions on either side without materially changing the position of the motor chassis or disturbing or impairing the ground gripping position of the opposite tractor unit.

With the above mentioned and other ends in view, the invention consists in the novel construction, arrangement and combination of parts, hereinafter described, illustrated in one of its embodiments in the accompanying drawings, and particularly pointed out in the appended claims.

Figure 1:
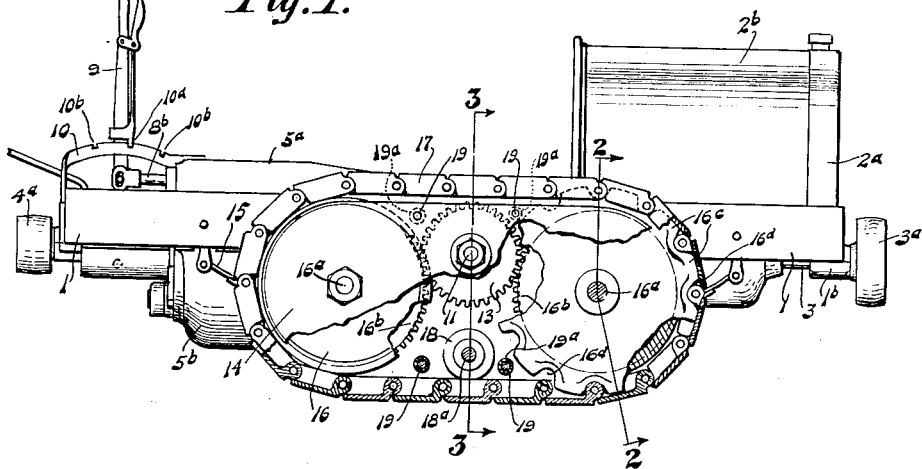

Referring to the drawings, forming a part of this specification, Figure 1, is a side elevation of a tractor constructed in accordance with this invention, certain portions of one of the caterpillar tractor members or units being broken away and shown in section for the purpose of clearer illustration of the parts.

Figure 2:
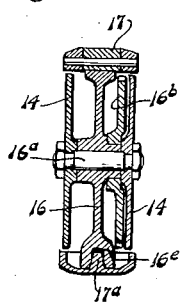

Fig. 2, a cross sectional view of one of the caterpillar tractor members taken on line 2—2 of Fig. 1.

Figure 3:
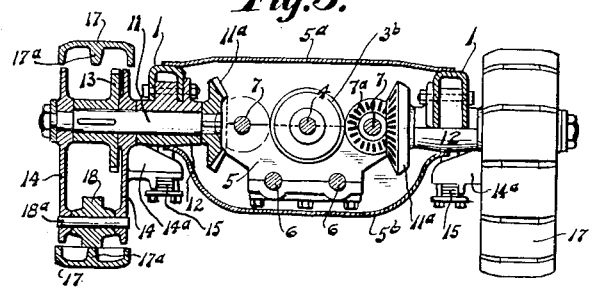

Fig. 3, a transverse sectional view taken on line 3—3 of Fig. 1, one of the caterpillar tractor members being shown in rear elevation.

Figure 4:
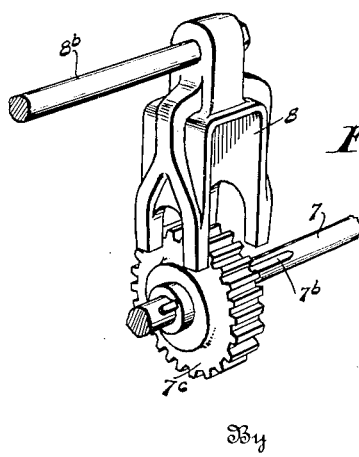

Fig. 4, a perspective disassembled view of one of the gear shifter members and shiftable gears on one of the caterpillar driving shafts for independently controlling and driving the caterpillar tractor members from a common prime mover or motor.

Figure 5:
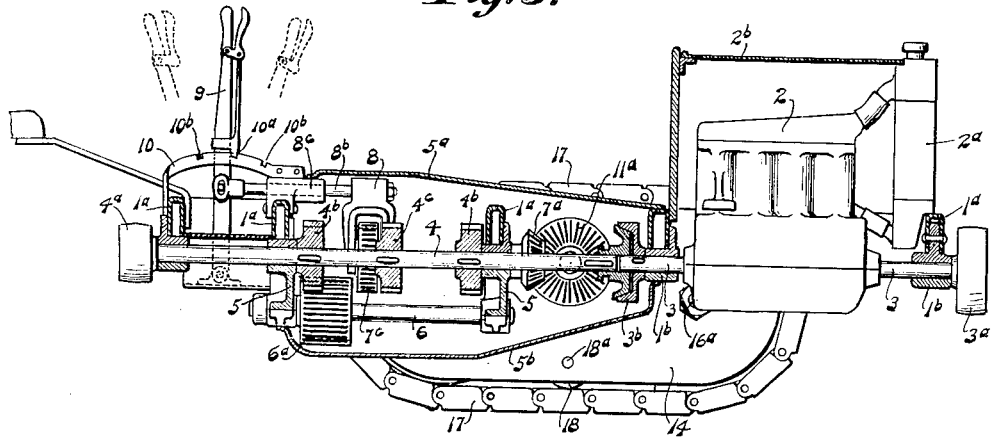

Fig. 5, a longitudinal sectional view of the tractor, the shifting levers and caterpillar driving gears being in neutral or disconnected position with respect to the motor.

Figure 6:
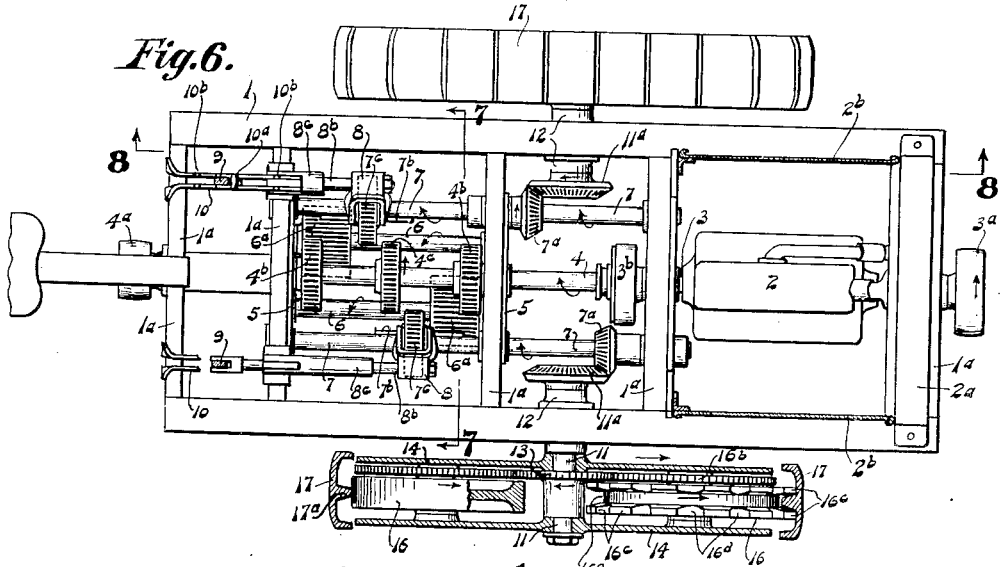

Fig. 6, a top plan view of the same with the gear casing removed.

Figure 7:
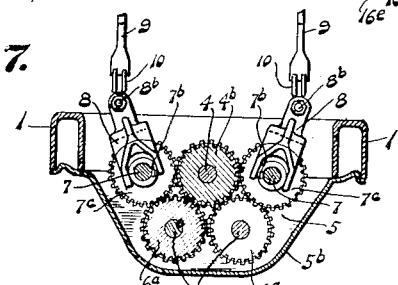

Fig. 7, a cross sectional view of the driving shafts and gearing taken on line 7—7 of Fig. 6.

Fig. 8, a longitudinal sectional view taken on line 8—8 of Fig. 6, illustrating the independent flexible action of a caterpillar tractor member and its supporting springs in passing over an obstruction.

Fig. 9, a diagrammatic top plan view illustrating the manner of turning and progressive turning movements of the tractor where but one of the caterpillar tractor members is connected to and driven from the motor or prime mover.

Fig. 10, a similar view illustrating the progressive turning movements where both caterpillar members are connected to and driven from the motor in opposite directions, and illustrating how the tractor may be completely turned in a circle from its common longitudinal and transverse center.

Similar numerals of reference designate like parts throughout all the figures of the drawings.

The improved tractor comprises a suitable tractor frame or chassis 1, provided with suitable cross frame members 1ª, adapted to give strength to the tractor frame as a whole, and provided with a suitable support for the gearing hereinafter described.

The frame or chassis 1 is provided with a suitable prime mover or motor 2, of any suitable and convenient form, said prime mover or motor 2, in the present instance, being provided with a suitable radiator 2ª and a suitable hood 2ᵇ.

The tractor side and cross frame members 1 and 1ª are preferably of inverted U-shape in cross section, as shown, for the purpose of giving proper strength, as well as affording convenient means for attaching the motor and gear bearing members to the frame, as hereinafter described.

The motor crank shaft 3 is preferably mounted in suitable bearing members 1ᵇ beneath the front cross frame members 1ª and may be provided with a driving pulley 3ª at the front.

The crank shaft 3 is preferably connected to the main or propeller shaft 4 by means of a suitable friction clutch 3ᵇ, which may be operated in any suitable or conventional manner, and forming no part of the present invention need not be further described in detail.

The main shaft 4 is mounted in suitable transmission heads or bearing blocks 5 suitably attached to cross frame members 1ª, and the main transmission shaft 4 is preferably provided at its rear with a driving pulley 4ª.

The transmission mechanism is preferably covered by means of a cover plate 5ª and is preferably shielded below by means of a bottom plate 5ᵇ.

As a means of independently driving and controlling caterpillar traction members or units constructed as hereinafter described and for the purposes hereinafter mentioned, the transmission bearing heads 5 are provided with oppositely arranged counter shafts 6 provided at diagonally opposite ends with relatively wide gears 6ª meshing with end gears 4ᵇ on the main shaft 4 and from which the counter shafts 6 are constantly driven. As the main shaft 4 is being driven in its normal direction by the motor and in the direction indicated by the arrow in Fig. 6 of the drawings, it will be understood that the counter shafts 6 and their relatively wide gears 6ª will be driven in a like but opposite direction from that of the shaft 4, as indicated by the arrows in said Fig. 6 of the drawings.

As a means of independently connecting and disconnecting, as well as independently driving the caterpillar traction members in either like or opposite directions, caterpillar or traction driving shafts 7 are mounted in the transmission heads 5 and are provided with bevel gears 7ª.

As a means of bringing the caterpillar driving shafts 7 into driving relation with the relatively wide gears 6ª of the counter shafts 6, whereby such driving shafts 7 will be driven in a like direction, as indicated by the arrow in Fig. 6, and in an opposite direction to the rotation of the shafts 6 and gears 6ª for driving the caterpillars forwardly, as hereinafter described, the driving shafts 7 are provided with shift gears 7ᶜ slidably mounted by means of key or spline members 7ᵇ, said shift gears 7ᶜ being adapted to be shifted by means of shift members 8 carried on shifting bars or rods 8ᵇ slidably mounted in bearing members 8ᶜ and connected to gear shift levers 9 mounted at the rear of the tractor frame and adapted to be held in their intermediate or neutral positions or their extreme shifted positions by means of intermediate and end notches 10ª and 10ᵇ, respectively, in the segment brackets 10.

As a means of reversing the direction of either one of the caterpillar driving shafts 7, and consequently of the caterpillar traction member to which it is attached, as hereinafter described, the main driving shaft 4 is provided with an intermediate driving gear 4ᶜ, and it will be obvious that if the opposite shift gear 7ᶜ on the opposite driving shaft 7 is left in engagement with the adjacent gear 6ª of the counter shafts 6, while the opposite shift gear is in engagement with the intermediate gear 4ᶜ, the respective caterpillar traction members will be driven in opposite directions, as indicated by the arrows in Fig. 10 of the drawings and the tractor will be turned in a complete circle, and on the other hand, if but one of the gears 6ª and the opposite gear 7ᶜ on the opposite driving shaft is shifted to one of the neutral positions shown in full lines in Fig. 6 of the drawings, that is to say,—in a position between the gears 6ª and 4ᶜ and out of engagement therewith,—the tractor will take the progressive turning positions indicated in Fig. 9 of the drawings.

Referring now to the improved caterpillar traction members or units and the improved means for flexibly and resiliently mounting the same to the tractor frame or chassis in independent relation to each other, it will be seen upon reference to Figs. 1, 2 and 3 of the drawings that each caterpillar traction member or unit is pivotally mounted on and driven from an axle driving shaft 11, each axle shaft 11 receiving its motion from the adjacent driving shaft 7 through the medium of a bevel gear 11ª meshing with the bevel gear 7ª on the shaft 7. Each axle driving shaft 11 is mounted in a suitable bearing 12 on the tractor side frame member 1 and is provided with a driving gear 13 arranged between the side members of the caterpillar frame 14, The caterpillar frame members 14 are adapted to swing upon the driving shaft 11 in connection with the resistance and the resiliency offered by the stub or half springs 15 (see Fig. 8 of the drawings) connected to the stub bearing blocks 14a arranged on the inner sides of the caterpillar frames. Each caterpillar frame is provided with a pair of carrying wheels 16 mounted on suitable bearing members 16a, said wheels 16 being adapted to receive their motion from the intermediate driving gear 13 fixed upon the axle driving shaft 11 by being provided with gear members 16b meshing with the intermediate gear 13, and the forward carrying wheel 16 is preferably provided with teeth 16c and intermediate notches 16d to receive and coöperate with the links of the endless traction member or link belt 17. The tooth members 16c are preferably provided with an intermediate recess 16e (see Fig. 2) to receive and contain an intermediate guiding projection 17a on the inner sides of the links of the traction member or belt 17, and the lower intermediate portion of each caterpillar frame 14 is preferably provided with a tension or friction roller 18 adapted to bear upon the lower pass of the endless traction member and mounted on a bearing member 18a extending between the side members of the caterpillar frame. The side members of the caterpillar frame may also be connected by means of spacing sleeves 19a mounted on connecting rods or bolts 19.

From the foregoing description, taken in connection with the accompanying drawings, the operation and advantages of my invention will be readily understood.

Having thus described one of the embodiments of my invention, what I claim and desire to secure by Letters Patent, is,—

1. In a tractor, the combination with a caterpillar carrying wheel provided with longitudinally recessed teeth; of an endless link belt having links provided with depending flanges at their sides and guiding projections on their inner sides adapted to pass into said longitudinally recessed teeth.

2. In a tractor, a caterpillar frame provided with a pair of carrying wheels, one of said carrying wheels being provided with teeth having centrally located recesses, and an endless link belt engaged by said teeth, said links having depending flanges at their sides being provided with a central guiding projection received by said recesses of said teeth.

3. In a tractor, a caterpillar frame provided with a pair of carrying wheels, one of said carrying wheels being provided with teeth having centrally located longitudinal recesses, and an endless link belt having its links engaged by said teeth and provided with side flanges and central guiding projections on the links entering said recesses of said teeth.

4. In a tractor, the combination with a caterpillar carrying wheel provided with longitudinally bifurcated teeth; of an endless traction link belt having links engaged by said teeth and longitudinally extending guiding flanges at the sides and central projections on the inner sides of said links extending into said bifurcations of said teeth.

5. A caterpillar tractor, comprising an axle driven shaft, a caterpillar frame made up of side members pivoted midway of its ends on said shaft, carrying wheels between said side members of said frame and provided with gears, a gear on said axle driving shaft between said side members meshing with said gears, and an endless tractor member on said carrying wheels and surrounding said side members to protect said wheels and gearing.

6. In a tractor, a tractor frame provided with axle driving shafts, caterpillar members pivoted on and driven from said axle driving shafts, caterpillar driving shafts carried by said tractor frame and geared to said axle driving shafts, shift gears mounted on said caterpillar driving shafts, transmission gearing including a main propeller shaft provided with end and intermediate gears, counter shafts provided with end gears meshing with the end gears of said main shaft, and means for shifting said shift gears between said end and intermediate gears of said counter and main shafts, respectively, whereby said caterpillar driving shafts may be driven either singly in either direction or simultaneously in opposite directions for controlling and steering said tractor.

7. In a tractor, a tractor frame provided with axle driving shafts, caterpillar members pivoted on and driven from said axle driving shafts, caterpillar driving shafts on said tractor frame and geared to said axle driving shafts, transmission gearing including a main shaft provided with end and intermediate gears, counter shafts provided with end gears meshing with said end gears of said main shaft, and shift gears on said caterpillar driving shafts arranged to be shifted between said end gears of said counter shafts and said intermediate gear of said main shaft for driving said caterpillar shafts in opposite directions or to be shifted between and out of engagement with said end and intermediate gears of said counter and main shafts for disconnecting said caterpillar driving shafts.

8. In a tractor, a tractor frame provided with axle driving shafts, bevel gears thereon, caterpillar members pivoted on and driven from said axle driving shafts, caterpillar driving shafts carried by said tractor frame and provided with bevel gears geared to said bevel gears on said axle driving shafts, shift gears mounted on said axle driving shafts, a main propeller shaft provided with end and intermediate gears, counter shafts provided with end gears meshing with the end gears of said main shaft, and shift levers and shift members for shifting said shift gears between said end and intermediate gears of said counter and main shafts, respectively, whereby said caterpillar driving shafts may be driven either singly in either direction or simultaneously in opposite directions for controlling and steering said tractor.

9. In a tractor, a tractor frame provided with axle driving shafts having bevel gears, caterpillar members pivoted on and driven from said axle driving shafts, caterpillar driving shafts on said tractor frame and provided with bevel gears geared to said bevel gears on said axle driving shafts, a main shaft provided with end gears and an intermediate gear, counter shafts provided with end gears diagonally arranged relative to each other and meshing with said end gears of said main shaft, shift gears on said caterpillar driving shafts, shift levers operatively connected to said shift gears and arranged to shift the latter between said end gears of said counter shafts and said intermediate gear of said main shaft for driving said caterpillar shafts in opposite directions, or to shift the same out of engagement therewith and between said end gears of said counter shafts and said intermediate gear of said main shaft for disconnecting said caterpillar driving shafts.

In testimony whereof I have affixed my signature.

JOSEPH E. BASTER.